E. A. SMEAD.
Converting Reciprocating into Rotary Motion.
No. 22,984. Patented Feb. 15, 1859.
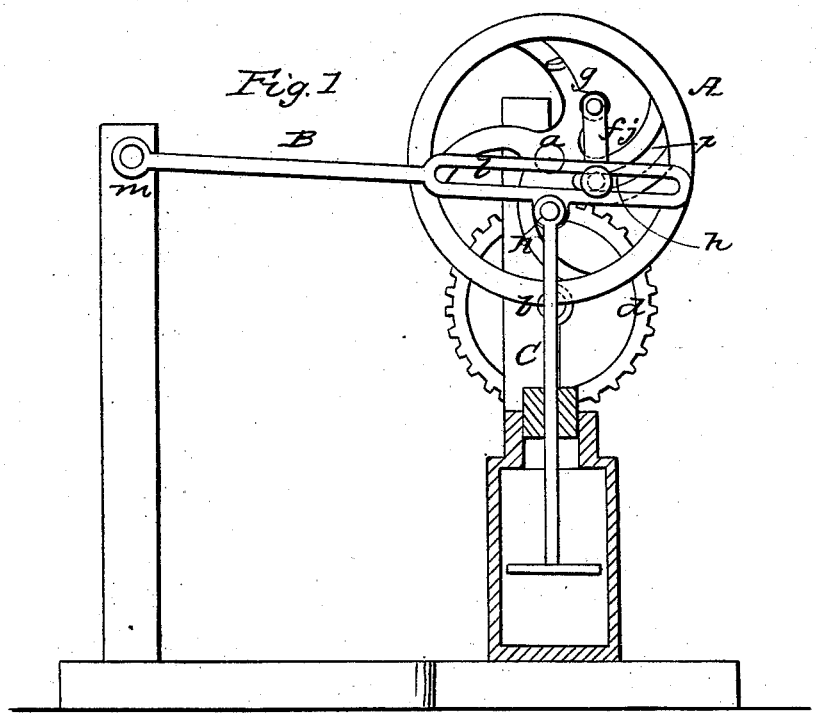
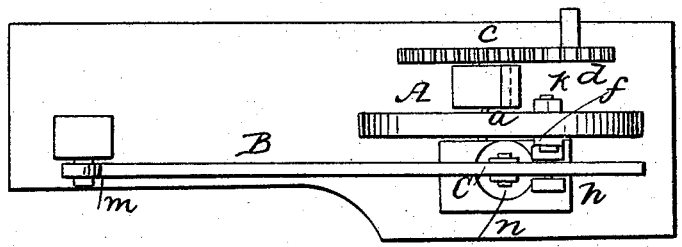
ATTEST
INVENTOR

UNITED STATES PATENT OFFICE.

E. A. SMEAD, OF TIOGA, PENNSYLVANIA.

CONVERTING RECIPROCATING INTO ROTARY MOTION.

Specification of Letters Patent No. 22,984, dated February 15, 1859.

*To all whom it may concern:*

Be it known that I, E. A. SMEAD, of Tioga, in the county of Tioga and State of Pennsylvania, have invented a new and Improved Mode of Converting a Reciprocating into a Rotary Motion and Vice Versa; and I do hereby declare that the following is a full, clear, and exact description of the same, reference being had to the annexed drawings, making a part of this specification, in which—

Figure 1, is a side view of my invention. Fig. 2, a plan or top view of ditto.

Similar letters of reference indicate corresponding parts in the two figures.

This invention consists in having an adjustable wrist pin attached to a fly wheel and fitted within a slotted vibrating arm which has a rod pivoted to it at right angles, the parts being arranged as hereinafter shown and described, whereby the desired result, to wit, the conversion of a rotary into a reciprocating motion and vice-versa, is attained by a simple arrangement of means and with the least possible loss or absorption of power by friction.

To enable those skilled in the art to fully understand and construct my invention I will proceed to describe it.

A, represents a fly wheel, the shaft $a$, of which may be connected with a power shaft $b$, by gearing $c$, $d$. To one of the arms $e$, of the fly wheel A, a bar $f$, is attached, by a pivot $g$, and to the end of this bar a wrist pin $h$, is attached, said wrist pin passing through a curved slot $i$, in one of the arms $j$, of the fly wheel and having a nut $k$, on its back end, by which nut the wrist pin may be secured at any desired point within the range of its movement, the slot $i$, being a part of a circle of which the pivot $g$, of the bar $f$, is the center, see Fig. 1.

The front end of the wrist pin $h$, is fitted in a slot $l$, of a bar or rod B, one end of which works on a fixed pin $m$, as a center, the slot $l$, being at the outer end of the bar or rod, as shown clearly in Fig. 1.

To the bar or rod B, at about the center of its slot $l$, a rod C, is pivoted either directly or by means of a link. In Fig. 1, the rod C is shown directly attached to the bar or rod B, by a pivot $n$.

From the above description it will be seen that if the fly wheel A, be rotated, the wrist pin $h$, will give a vibratory motion to the bar or rod B, in consequence of working in the slot $l$, and it will be observed that the wrist pin $h$, as wheel A, rotates, does not act on the slotted rod B, at right angles, but rather obliquely to it, so that the wrist pin is virtually working against an inclined plane, the slot $l$, moving in the arc of a circle of which the pin $m$, is the center. And it will also be seen that if a reciprocating motion be given the rod C, a rotary motion will be given the wheel A, and shaft $b$.

The vibrating movement of the bar or rod B, communicates a rectilinear reciprocating movement to the rod C, provided a link connection is formed between the rods B and C. If the link connection is not used the movement of rod C, will approximate to a rectilinear movement.

The length of stroke of the rods B, C, may be varied as desired by shifting the wrist pin $h$, nearer to or further from the center of wheel A.

I am aware that wrist pins attached to fly wheels have been connected to rods in various ways so as to effect the same purpose as the invention herein shown and described, but, I am not aware that an adjustable wrist pin has been fitted in a slotted bar working on a pivot or center so as to operate in the very efficient way as herein shown and described, for by the within described invention all guides are dispensed with and but few working parts employed.

Having thus described my invention what I claim as new and desire to secure by Letters Patent, is,

The fly wheel A, with the adjustable wrist pin $h$, attached, in connection with the slotted bar or rod B, and rod C, the whole being arranged to operate substantially as and for the purpose herein set forth.

E. A. SMEAD.

Witnesses:
WM. TUSCH,
W. HAUPT.